UNITED STATES PATENT OFFICE.

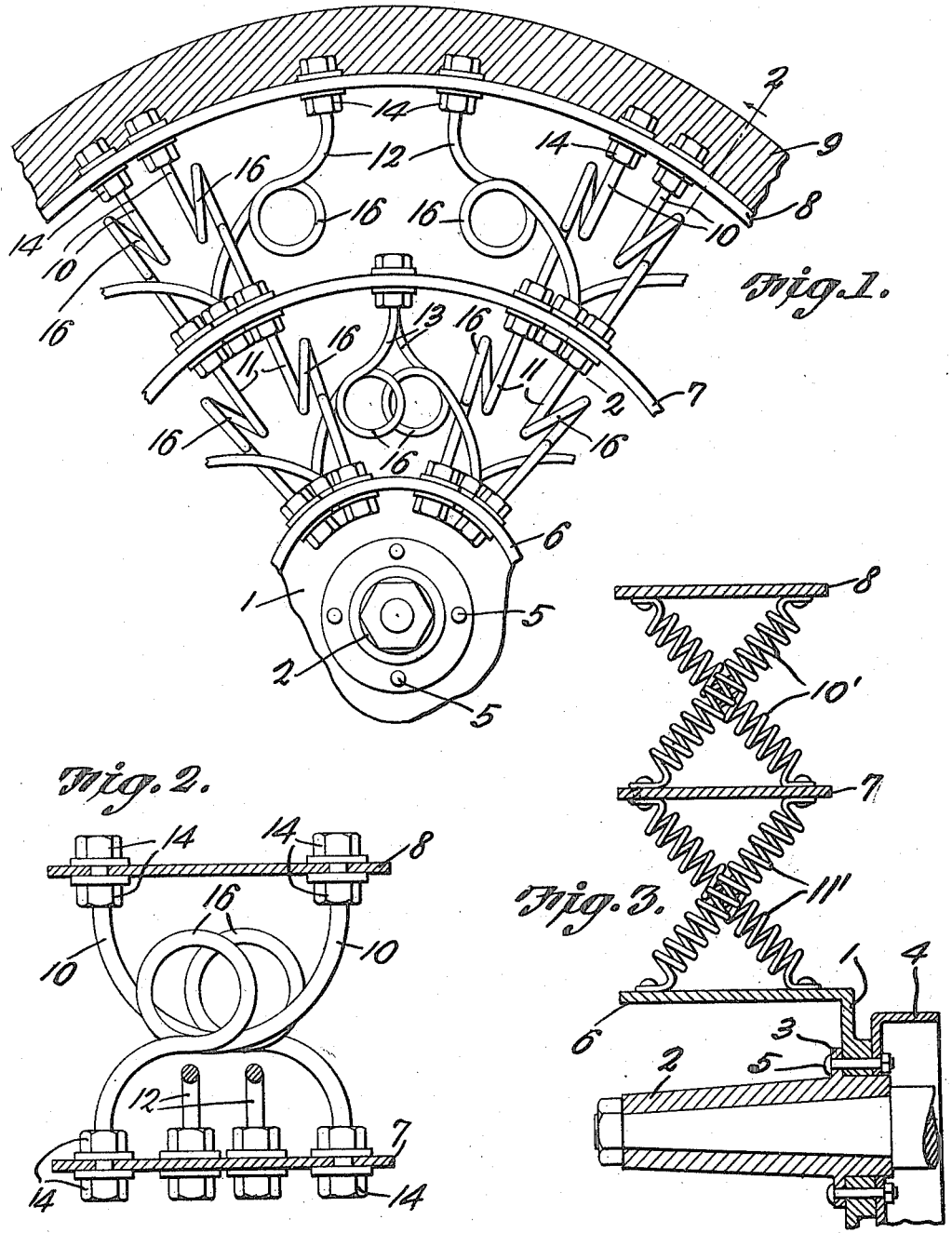

ABRAHAM MORGAN, OF INDEPENDENCE, MISSOURI.

RESILIENT WHEEL.

1,221,570.      Specification of Letters Patent.      Patented Apr. 3, 1917.

Application filed August 9, 1916. Serial No. 113,973.

*To all whom it may concern:*

Be it known that I, ABRAHAM MORGAN, a citizen of the United States, residing at Independence, in the county of Jackson and State of Missouri, have invented a new and useful Resilient Wheel, of which the following is a specification.

The present invention appertains to resilient or spring wheels, and aims to provide a wheel of that character for use upon automobiles and other vehicles which is of novel construction, whereby the wheel is quite rigid when at a standstill or when traveling upon a smooth pavement, but which provides for effective resiliency when the wheel strikes an obstruction or is moving over rough roads.

A further object of the invention is to provide a wheel of the nature indicated which has sufficient rigidity to avoid the excessive objectionable depression of the axle below the center of the wheel under ordinary conditions, but which at the same time is sufficiently resilient to avoid the shocks perfectly, providing for easy riding, the shocks being absorbed no matter in which direction the strains may originate. The present wheel is intended to replace ordinary rigid wheels having pneumatic tires, to eliminate the expense incident to pneumatic tires, and at the same time, to provide the advantages of pneumatic tired wheels without having the disadvantageous features thereof.

With the foregoing and other objects in view which will appear as the description proceeds the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a fragmental side elevation of the improved wheel.

Fig. 2 is a sectional detail taken on the line 2—2 of Fig. 1.

Fig. 3 is a radial section of the wheel having modified forms of springs.

In carrying out the invention, there is provided a hub disk 1 adapted to be placed upon the hub 2 of an ordinary automobile or equivalent wheel, the hub 2 having the flange 3 against which the spokes are normally clamped but in the present instance, the disk 1 is placed against the flange 3, and is clamped between said flange and the brake drum disk 4 by means of the usual bolts 5. The disk 1 is provided at its periphery with a transversely extending annular flange 6 forming the inner band of three bands of which the wheel is composed.

The wheel embodies an intermediate resilient band 7 surrounding and spaced from the inner band 6, and an outer resilient band or rim 8 surrounding and spaced from the band 7. A suitable tire 9 is mounted in any suitable manner upon the outer band or rim 8. The bands 7 and 8 are sufficiently rigid to retain their circular forms under ordinary conditions, but are sufficiently resilient in order that they can be bent out of circular shape, as when the wheel strikes an obstruction. Thus, the various portions of the band 8 can be pressed inwardly when striking an obstruction, and the band 7 can also be distorted, both bands being restored to normal circular form when the strains are removed.

Disposed between the bands 7 and 8 are a plurality of pairs of springs 10 disposed radially, and formed of rods.

Similar springs 11 are disposed between the bands 6 and 7 on the same radial lines as the springs 10 and the springs 11 are also arranged in pairs. Other springs 12 are disposed between the bands 7 and 8, and other springs 13 are disposed between the bands 6 and 7. The springs 12 and 13 are approximately parallel with the median plane of the wheel, while the springs 10 and 11 are arranged substantially at right angles to said plane. Each of the springs is formed of a rod, and is of the shape of a compound curve, being provided intermediate its ends or between its oppositely curved portions with a coil 16 to increase the resiliency of the spring. The outer ends of the springs 10 and 12 engage radially with the band 8 and the inner ends of said springs engage radially with the band 7, while the outer ends of the springs 11 and 13 are engaged radially with the band 7 and the inner ends of the last mentioned springs are engaged radially with the band 6. Nuts 14 are threaded upon the terminals of all of the springs upon the outer and inner sides of the respective bands to clamp the terminals of the springs to the bands. The outer ends of the springs 12 are engaged with the band 8 between the pairs of springs 10, and the inner ends of the springs 12 are engaged with the bands 7 between the inner ends of the springs 10 of the respective pairs, which is also true of the springs 13 with respect to the springs 11 and bands 6 and 7. Thus, the outer ends of the springs 13 are engaged with the band 7 between the pairs of springs 11 and the inner ends of the springs 13 are engaged with the band 6 between the inner ends of the springs 11 of the respective pairs. The outer ends of the springs 13 are disposed side by side, while the outer ends of the springs 12 are spaced apart longitudinally of the band 8. The springs 10 and 11 serve to avoid the lateral shifting of the bands 7 and 8 out of the median plane of the wheel unless the bands are subjected to unusual transverse strains, and all of the springs tend to prevent the relative rotary movements of the bands unless compelled to by the shocks or jars. The springs permit of the yielding movement of the bands, which in addition to the resiliency of the bands, provides for the absorption of the shocks. The springs and bands are ordinarily sufficiently rigid or stiff, to avoid the excessive depression of the hub 2 and axle upon which the hub is mounted.

In the modification shown in Fig. 3, crossed coiled springs 10' are disposed between and terminally secured to the bands 7 and 8, and similar springs 11' are disposed between and terminally secured to the bands 6 and 7. The springs 10' and 11' the same as the springs 10 and 11 above described, are disposed in radial transverse planes of the wheel.

Having thus described the invention, what is claimed as new is:—

1. A resilient wheel comprising inner, intermediate and outer bands, the intermediate and outer bands being resilient, and springs between and attached to the bands, some of the springs being disposed substantially parallel to the median plane of the wheel and the others being disposed transversely.

2. A resilient wheel embodying bands, one surrounding the other, and pairs of radial springs disposed between and terminally attached to the bands, the springs of each pair being in reversed position and crossed, and other springs between and terminally attached to the bands and disposed substantially parallel to the median plane of the wheel.

3. A resilient wheel embodying bands, one surrounding the other, pairs of compound-curved springs between and terminally attached to the bands and having coils between the oppositely curved portions, the springs of each pair being in reversed crossed position, and other compound-curved springs disposed between and terminally attached to the bands, the last mentioned springs having coils between their oppositely curved portions, and the last mentioned springs being disposed substantially parallel to the median plane of the wheel.

In testimony that I claim the foregoing as my own, I have hereto affixed my signature in the presence of two witnesses.

ABRAHAM MORGAN.

Witnesses:
   Geo. A. Gould,
   C. G. Gould.

Copies of this patent may be obtained for five cents each, by addressing the "Commissioner of Patents, Washington, D. C."